United States Patent
Bonny

(10) Patent No.: US 9,423,025 B1
(45) Date of Patent: *Aug. 23, 2016

(54) DRIVE SYSTEM HAVING A VARIABLE OUTPUT PUMP

(71) Applicant: Hydro-Gear Limited Partnership, Sullivan, IL (US)

(72) Inventor: Nathan W. Bonny, Shelbyville, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 134 days.

This patent is subject to a terminal disclaimer.

(21) Appl. No.: 14/261,585

(22) Filed: Apr. 25, 2014

Related U.S. Application Data

(63) Continuation of application No. 13/366,737, filed on Feb. 6, 2012, now Pat. No. 8,708,676, which is a continuation of application No. 12/336,183, filed on Dec. 16, 2008, now Pat. No. 8,109,747.

(60) Provisional application No. 61/019,491, filed on Jan. 7, 2008, provisional application No. 61/014,273, filed on Dec. 17, 2007.

(51) Int. Cl.
| | |
|---|---|
| *F03C 2/00* | (2006.01) |
| *F03C 4/00* | (2006.01) |
| *F04C 2/00* | (2006.01) |
| *F16H 61/437* | (2010.01) |
| *B60K 17/10* | (2006.01) |
| *F04C 2/10* | (2006.01) |

(Continued)

(52) U.S. Cl.
CPC ............ *F16H 61/437* (2013.01); *B60K 17/105* (2013.01); *F01C 1/103* (2013.01); *F01C 1/104* (2013.01); *F04C 2/102* (2013.01); *F04C 2/103* (2013.01); *F04C 2/104* (2013.01); *F04C 23/001* (2013.01); *F04C 23/005* (2013.01); *B62D 5/097* (2013.01); *F04C 2270/56* (2013.01)

(58) Field of Classification Search
CPC .................. F04C 2/103–2/105; F04C 23/001; F04C 23/005; F04C 18/0215; F04C 2270/56; F04C 2/102; F01C 1/103–1/104; F01C 11/00; F01C 11/001; B62D 5/097; B60K 17/105
USPC ..................... 418/61.3, 166, 171, 270, 3, 5, 9; 417/199.1, 205; 60/487–490
See application file for complete search history.

(56) References Cited

U.S. PATENT DOCUMENTS

| | | |
|---|---|---|
| 2,266,191 A | 12/1941 | Granberg |
| 2,649,739 A | 8/1953 | Hufferd et al. |

(Continued)

*Primary Examiner* — Theresa Trieu
(74) *Attorney, Agent, or Firm* — Neal, Gerber & Eisenberg LLP

(57) ABSTRACT

A variable output assembly including a hydraulic pump disposed on a pump running surface located on a center section, end cap or other hydraulic mounting member. The pump may be a gerotor or other rotatable pump body. A support member is disposed between the pump running surface and the pump and includes a pump support surface having openings to permit fluid communication between the support member and the pump running surface. The support member is movable between neutral and a plurality of positions corresponding to forward and reverse directions of the output. In forward and reverse positions, the support member permits fluid communication between the pump and a first porting system, and in the neutral position the support member permits fluid communication between the pump and a sump through the support surface openings and a second porting system.

20 Claims, 9 Drawing Sheets

(51) Int. Cl.
  *F01C 1/10* (2006.01)
  *F04C 23/00* (2006.01)
  *B62D 5/097* (2006.01)

(56) References Cited

U.S. PATENT DOCUMENTS

| | | |
|---|---|---|
| 2,898,862 A | 8/1959 | Brundage |
| 2,988,007 A | 6/1961 | Quintilian |
| 3,007,418 A | 11/1961 | Brundage |
| 3,106,897 A | 10/1963 | Johnson |
| 3,177,665 A | 4/1965 | Power |
| 3,198,127 A | 8/1965 | Brundage |
| 3,362,161 A | 1/1968 | Flint |
| 4,413,960 A | 11/1983 | Specht |
| 4,674,287 A | 6/1987 | Ishimori et al. |
| 5,546,752 A | 8/1996 | Horton et al. |
| 6,122,996 A | 9/2000 | Hauser et al. |
| 6,126,420 A | 10/2000 | Eisenmann |
| 6,571,554 B2 | 6/2003 | Johnson |
| 6,691,512 B1 | 2/2004 | Kopel et al. |
| 7,028,708 B1 | 4/2006 | Langenfeld et al. |
| 2004/0175277 A1 | 9/2004 | Cox et al. |
| 2007/0193264 A1 | 8/2007 | Dong et al. |

DRIVE SYSTEM HAVING A VARIABLE OUTPUT PUMP

CROSS-REFERENCE

This application is a continuation from U.S. application Ser. No. 13/366,737 filed on Feb. 6, 2012, which is a continuation from U.S. application Ser. No. 12/336,183 filed on Dec. 16, 2008, now U.S. Pat. No. 8,109,747, which claims priority to U.S. Provisional App. Ser. No. 61/014,273 filed on Dec. 17, 2007 and to U.S. Provisional App. Ser. No. 61/019,491 filed on Jan. 7, 2008. The contents of all of these applications are fully incorporated herein by reference in their entirety.

BACKGROUND OF THE INVENTION

This invention relates to hydraulic drive systems which may be used, for example in vehicles and, in particular, vehicles having continuously variable drive systems. Such hydraulic drive systems come in an array of configurations. One example of such a system is shown in commonly owned U.S. Pat. No. 6,122,996. These systems provide an array of benefits, but even with the array of configurations currently available there is a need for even greater compactness and reduced cost.

SUMMARY OF THE INVENTION

A vehicle drive system incorporating a variable output gerotor pump and a fixed gerotor motor is disclosed herein. An adjustable gerotor support member is rotatable to a variety of positions to alter the output of the gerotor pump and, at a specified position, provide a neutral displacement. The details of the invention are set forth below in connection with the detailed description of the embodiments.

A better understanding of the invention will be obtained from the following detailed description and accompanying drawings, which set forth illustrative embodiments that are indicative of the various ways in which the principals of the invention may be employed.

DETAILED DESCRIPTION OF THE DRAWINGS

Figure 1:
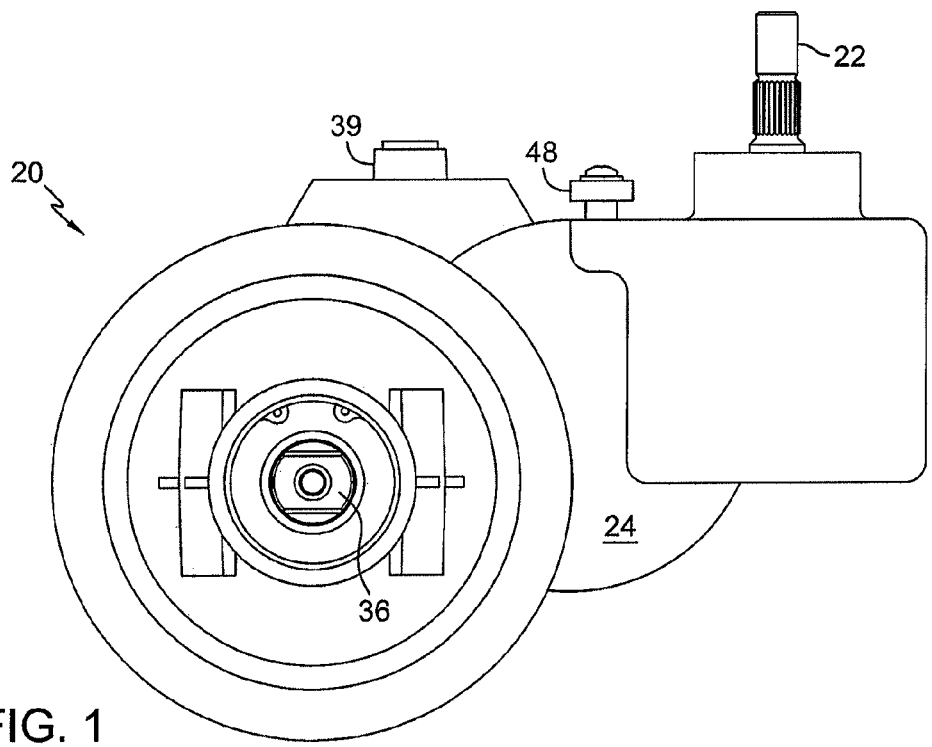
FIG. 1 is a side elevational view of a drive system incorporating a first embodiment of the present invention.
Figure 3:
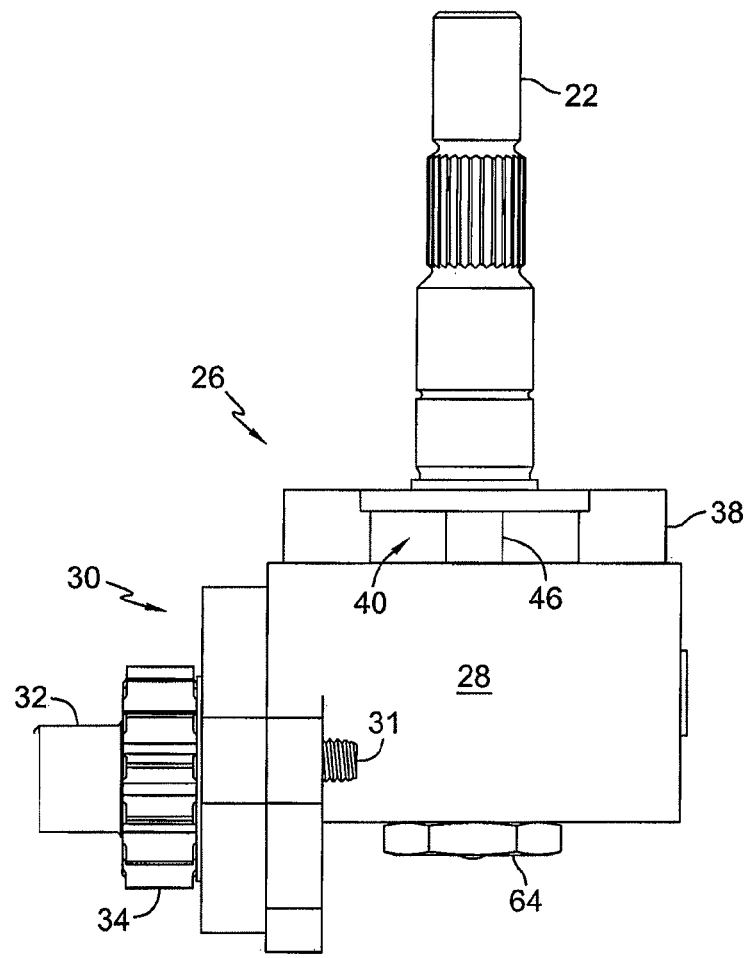
FIG. 3 is a side elevational view of a drive system including a hydraulic mounting member with a variable output gerotor pump and a gerotor motor mounted on it, in accordance with the first embodiment of this invention.
Figure 15:
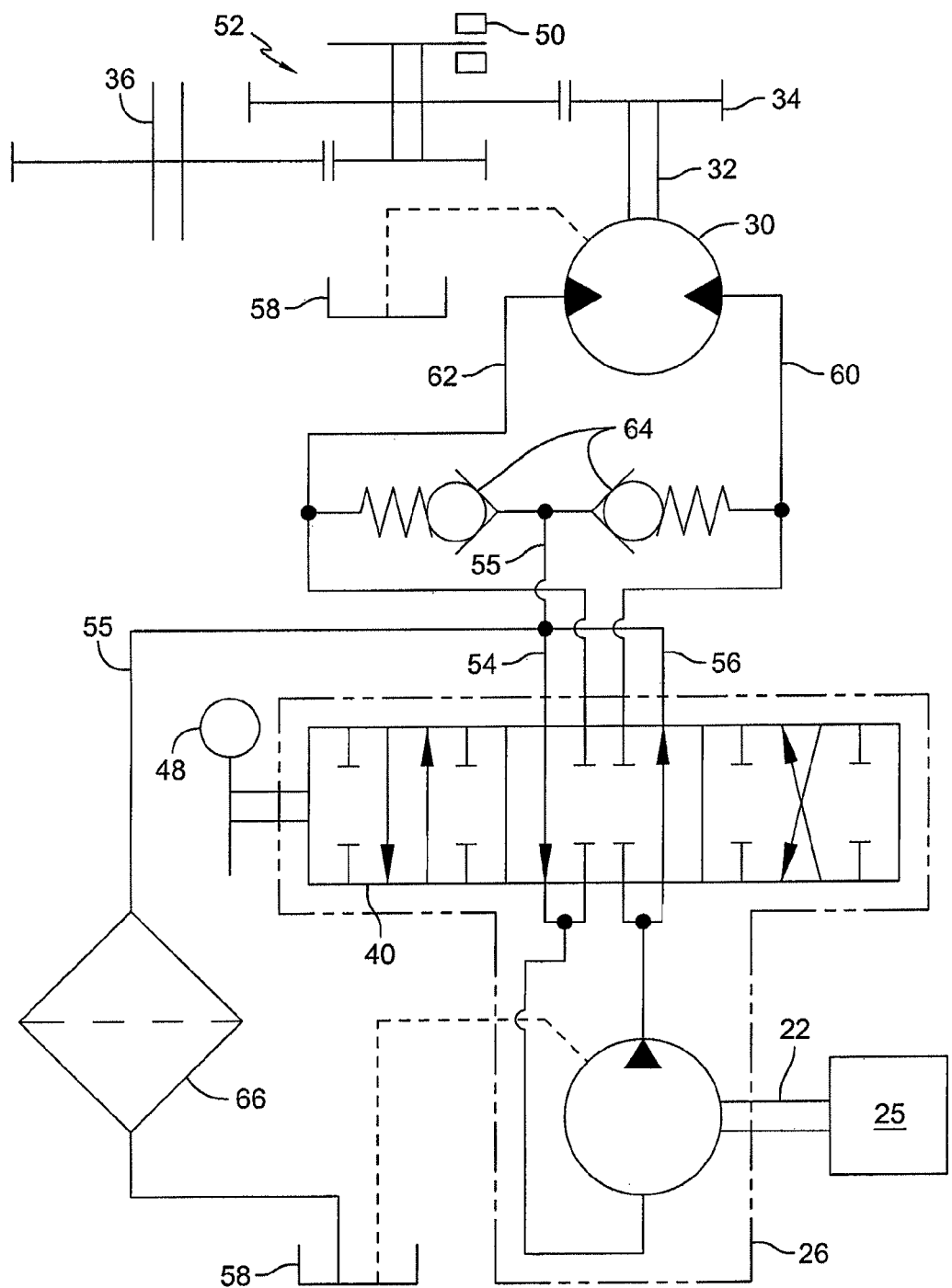
FIG. 15 is an exemplary hydraulic schematic of a drive system in accordance with one embodiment of the present invention.

Turning now to the figures, where like reference numerals refer to like elements, there is illustrated in FIGS. 1, 3 and 15 a first embodiment of drive system 20. Drive system 20 comprises an input shaft 22 which receives motive force from a prime mover 25 and which may be supported within a housing 24. Input shaft 22 is drivingly coupled to a variable output gerotor pump assembly 26 supported on a hydraulic mounting member 28. As will be described in more detail, hydraulic mounting member 28 comprises porting that fluidly connects gerotor pump assembly 26 with a gerotor motor assembly 30, which may be attached to hydraulic mounting member 28 by fasteners 31. It will be understood that the embodiments depicted are for use in a vehicle drive system, but that the invention has applicability in other drive systems as well.

Gerotor motor assembly 30, comprising inner gerotor element 30b and outer gerotor element 30a, is drivingly coupled to an output shaft 32 that may also be called a motor shaft. Output shaft 32 may have a gear 34 or other driving configuration positioned thereon that may drive an axle 36. As shown in the schematic of FIG. 15, gear 34 may also drive a gear train 52 that may include a differential (not shown) to then drive one or more axle shafts 36. Though not shown, it will also be understood by one of skill in the art that output shaft 32 may itself be an axle shaft.

It should also be apparent to a person of ordinary skill in the art that while the terminology "gerotor" is used throughout this description, there are equivalent mechanisms and terminologies known in the art, such as gerollers, trochoidal pumps, and other equivalent devices. Therefore, the terminology "gerotor" is a term representative of a type of pump that accomplishes movement of fluid in the manner described herein and is not to be read as limited to the specific hardware disclosed in the figures.

Drive system 20 may comprise additional elements such as a vent 39 or a connection for an expansion tank, which may be separately mounted or directly mounted to drive system 20. Other additional elements that may be included are a brake 50, as shown in FIG. 15, a power take-off (not shown), or a hydraulic bypass (not shown).

The operation of drive system 20 will now be explained, with references FIGS. 3, 4, 5 and 15. As input shaft 22 is rotated by a prime mover 25, such as a vehicle engine or an electric motor (not shown), inner gerotor element 44 and outer gerotor element 42 will rotate. Rotation of inner gerotor element 44 and outer gerotor element 42 causes hydraulic fluid to be displaced from gerotor assembly 26 through hydraulic porting formed in hydraulic mounting member 28. This hydraulic porting comprises first and second system passages 60 and 62, which act to connect pump assembly 26 and motor assembly 30, as well as alternative passages 54 and 56, as shown in the schematic of FIG. 15 and described in more detail herein. It will be understood by one of skill in the art that the shapes of the passages used herein are not critical, and such passages can be formed in various manners, including, e.g., casting or drilling. In the embodiment depicted in e.g., FIG. 11, hydraulic mounting member 28 has a first generally planar side on which pump assembly 26 is disposed, a second generally planar side on which motor assembly 30 is disposed and a third generally planar side formed opposite the first side.

Figure 7:
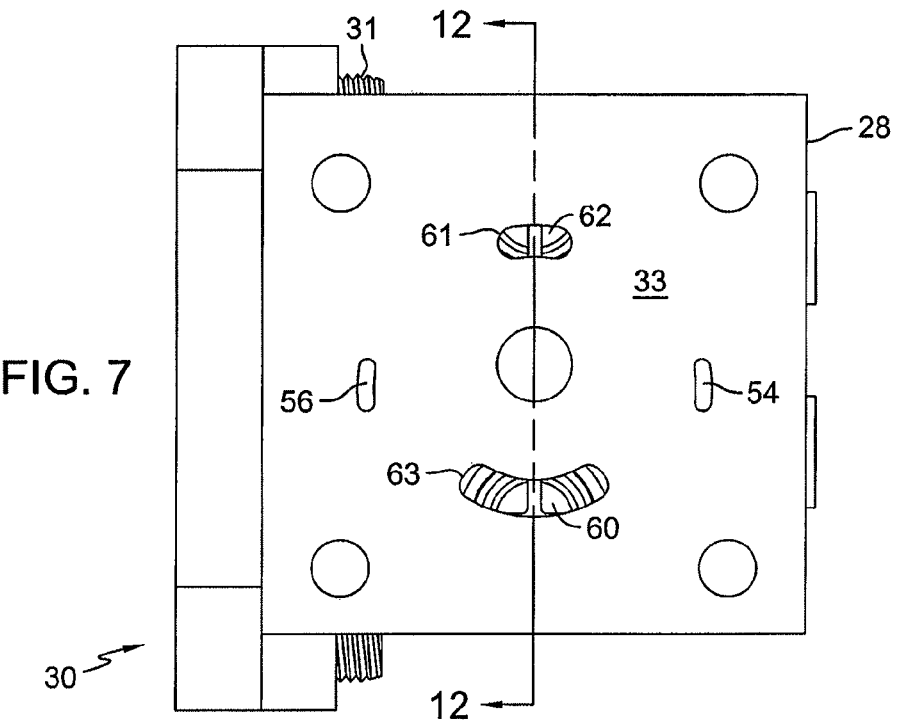
FIG. 7 is a top plan view similar to FIG. 6, with the variable output gerotor of the drive system completely removed.
Figure 13:
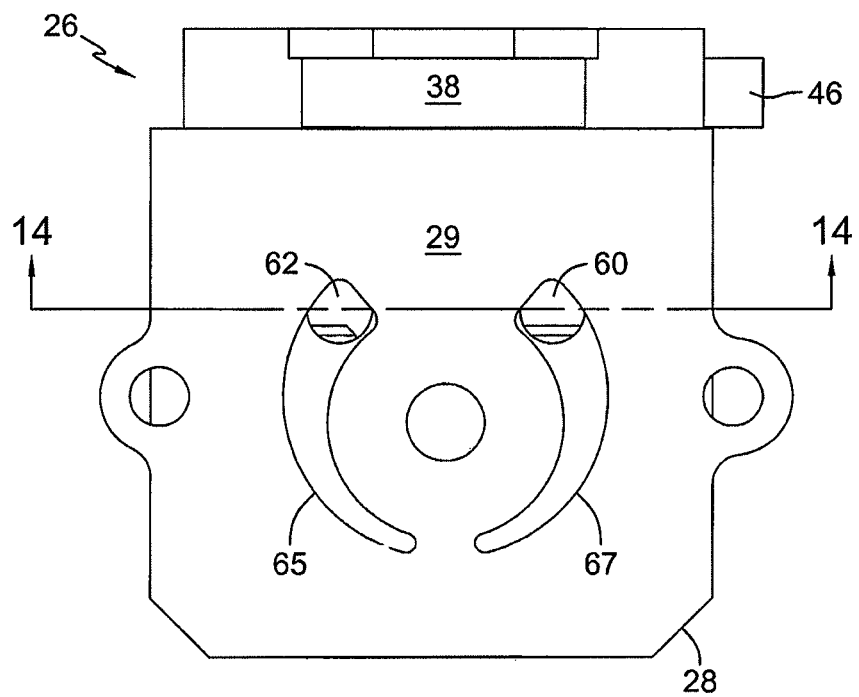
FIG. 13 is a side elevational view of the hydraulic mounting member, showing the motor mounting face.
Figure 14:
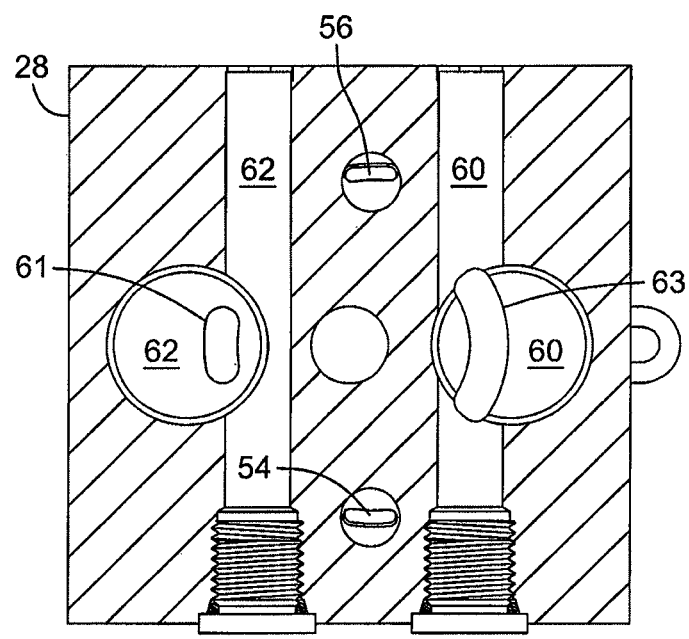
FIG. 14 is a sectional view of the hydraulic mounting member along lines 14-14 in FIG. 13.

As shown in FIGS. 7, 13 and 14, the hydraulic porting further comprises kidney ports 61 and 63 formed on pump mounting face 33 of member 28, and kidney ports 65 and 67 formed on motor mounting face 29. Kidney ports 61 and 65 both communicate with passage 62 while kidney ports 63 and 67 both communicate with passage 60, thereby permitting communication between pump assembly 26 and motor assembly 30 through a closed loop system during operation, which may be referred to as a first porting system. As discussed in more detail below, cup base wall 43 includes kidney-shaped openings 68, 70 which cooperate with kidney ports 61 and 63.

Figure 5:
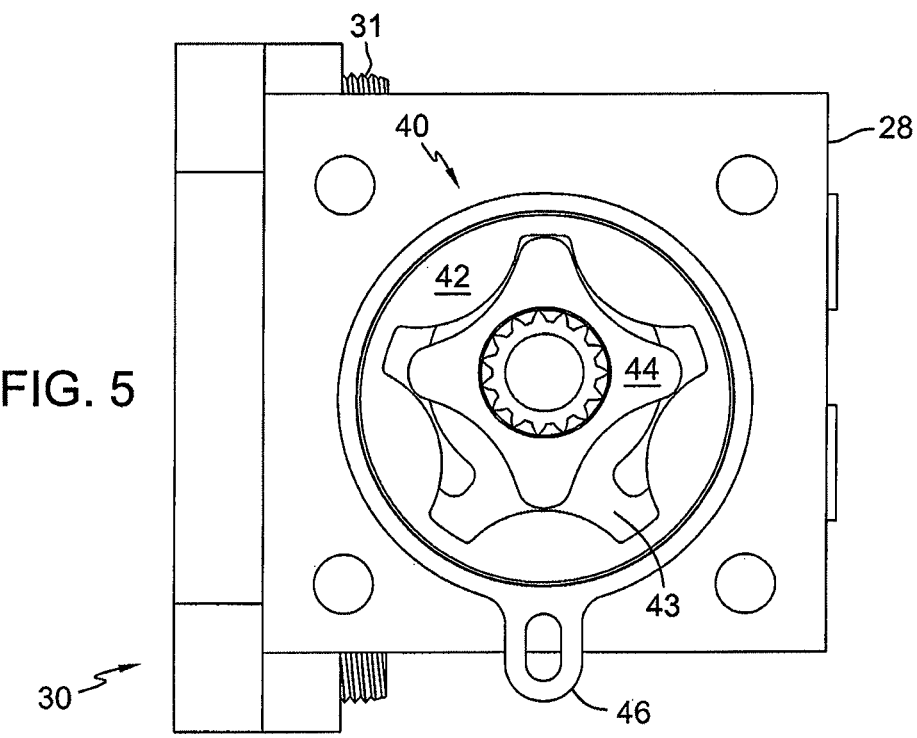
FIG. 5 is a top plan view of the hydraulic mounting member and components of the gerotor pump assembly of FIG. 4, with a cover of the variable output gerotor pump housing removed.

Referring to FIG. 5, it will be noted that outer gerotor element 42 and inner gerotor element 44 are positioned such that the optimal area for fluid input and for fluid output to and from these elements is offset from the center of rotation of inner gerotor element 44. Kidney-shaped openings 68, 70 in cup base wall 43 are configured to match the optimal area of fluid input and fluid output from outer gerotor element 42 and inner gerotor element 44 and thus attain the appearance shown in FIG. 8. Kidney port 61 and kidney port 63 are formed of different lengths corresponding to the smaller gap between kidney-shaped openings 68, 70 at one end of kidney-shaped openings 68, 70 and the larger gap between kidney-shaped openings 68,70 at the other end of the kidney-shaped openings 68,70. Variable output gerotor pump assembly 26 comprises a cover 38, through which input shaft 22 may extend. Cover 38 may be fastened to hydraulic mounting member 28 by way of fasteners 41. Rotatably mounted within cover 38 and positioned adjacent to hydraulic mounting member 28 is a gerotor support member or pump support 40. For purposes of this disclosure, the gerotor support member or pump support 40 will be referred to as cup 40.

Outer gerotor element 42 and inner gerotor element 44 are housed within cup 40, as shown in FIG. 5. Inner gerotor element 44 is mated to input shaft 22 so that rotation of input shaft 22 will cause inner gerotor element 44 to rotate, thus also moving outer gerotor element 42.

Cup 40 includes a base wall 43 disposed on the pump running surface 33 of hydraulic mounting member 28 and a side wall 45 extending upwards from base wall 43 to form a cylinder. Base wall 43 includes two opposing, kidney-shaped openings 68 and 70 to permit fluid communication between cup 40 and the hydraulic porting formed in mounting member 28 as described herein. The use of cup 40 assists in supporting side loads from the movement of outer gerotor element 42 and inner gerotor element 44; cover 38 could be modified so as to handle such stresses, so the cup shape and the interface of that shape with cover 38 is not critical to this invention.

Figure 2:
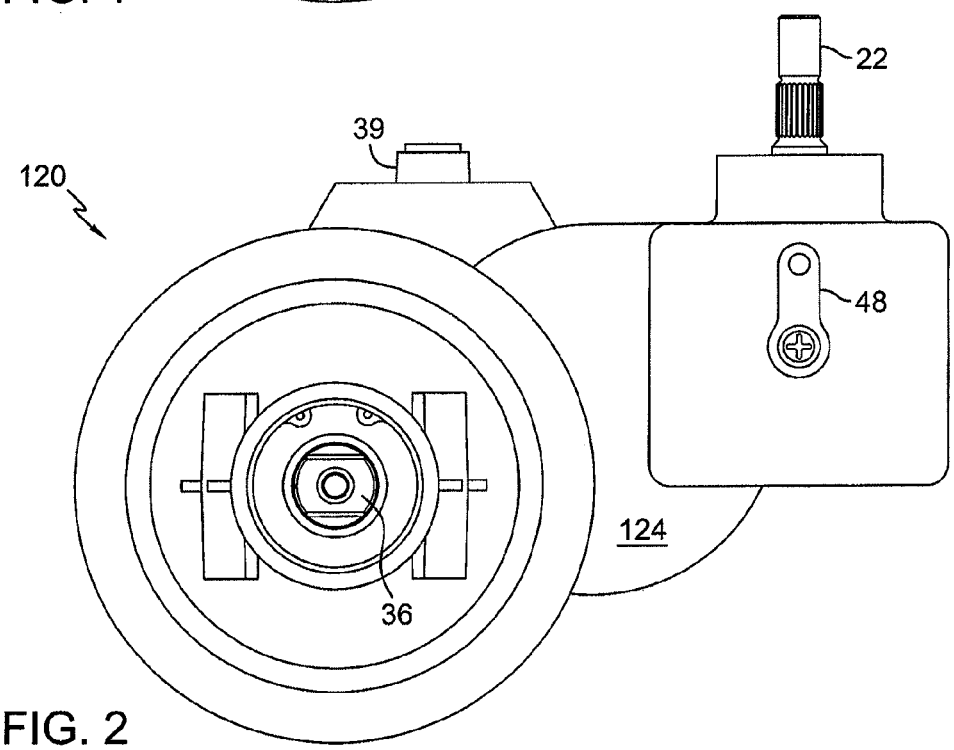
FIG. 2 is a side elevational view of a drive system incorporating a second embodiment of the present invention.

Cup 40 further includes a protrusion 46 extending outwardly from its periphery and which is attached to a separate control 48, and the position of cup 40 on pump running surface 33 is adjusted by movement of protrusion 46, which is attached either directly to control 48 or by way of a linkage (not shown). Control 48 may be located in various places on drive system 20. For example, in the first embodiment depicted in FIG. 1, control 48 is disposed on the side of housing 24 adjacent input shaft 22, while in a second embodiment, as shown in FIG. 2, control 48 may be located on a side of housing 124 of drive system 120 perpendicular to input shaft 22. In both cases, control 48 is connected to protrusion 46 through a linkage (not shown). As will be described below, movement of cup 40 changes the location of openings 68 and 70 with respect to different components of the porting formed in hydraulic mounting member 28, in order to change the flow of hydraulic fluid from gerotor assembly 26.

Figure 4:
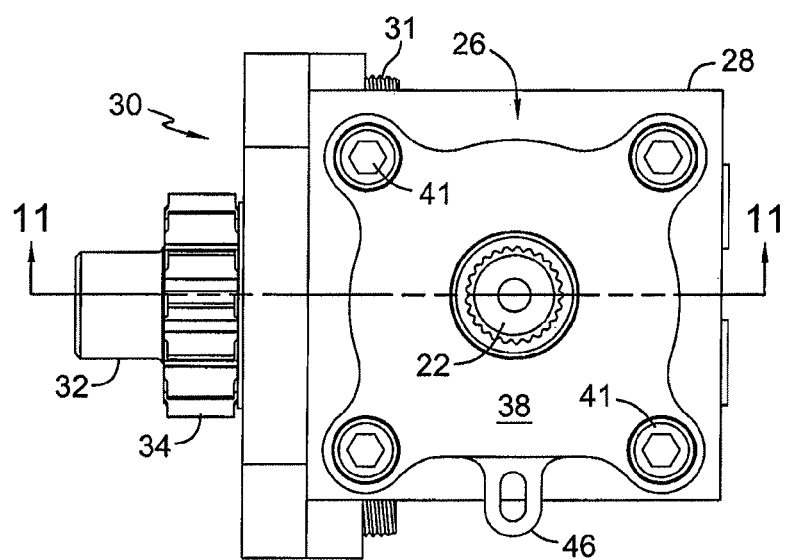
FIG. 4 is a top plan view of the drive system of FIG. 3.
Figure 8:
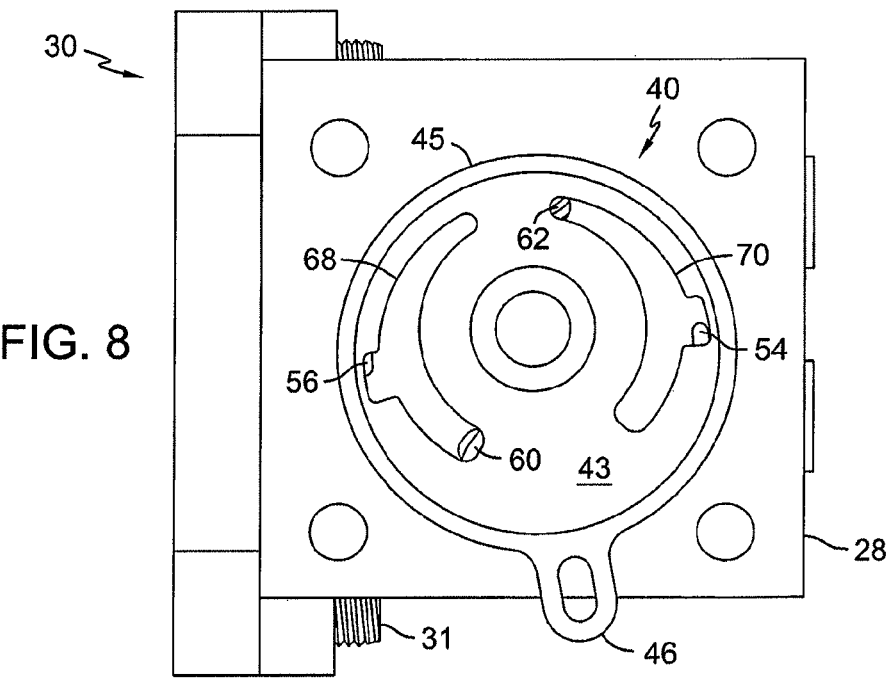
FIG. 8 is a top plan view similar to FIG. 6, showing the gerotor cup rotated in a first direction.
Figure 9:
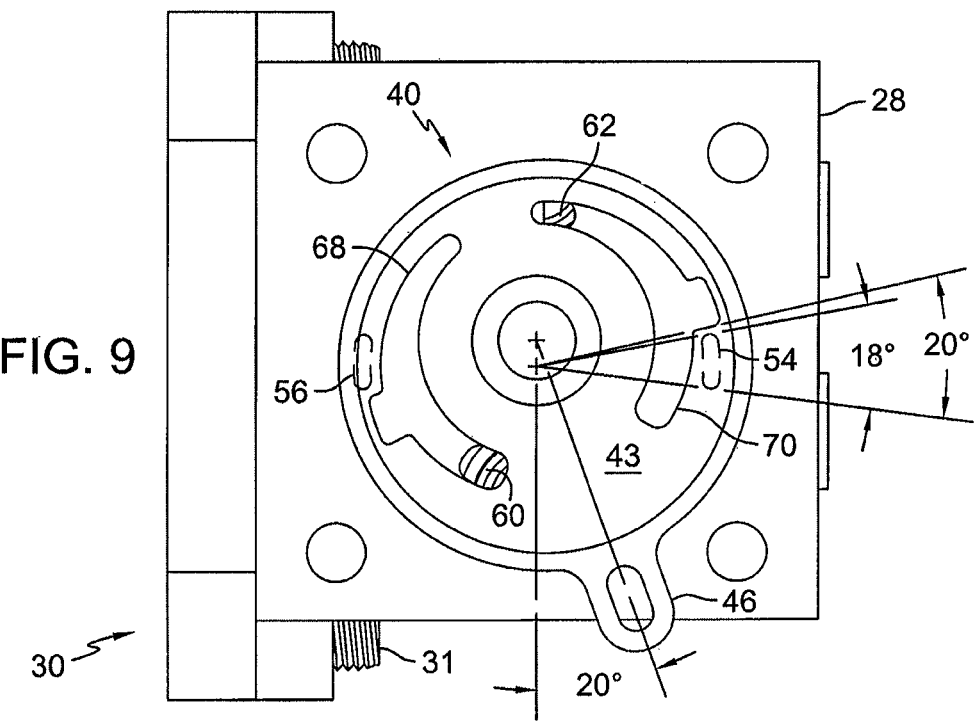
FIG. 9 is a top plan view similar to FIG. 8, showing the gerotor cup rotated further in the first direction.
Figure 10:
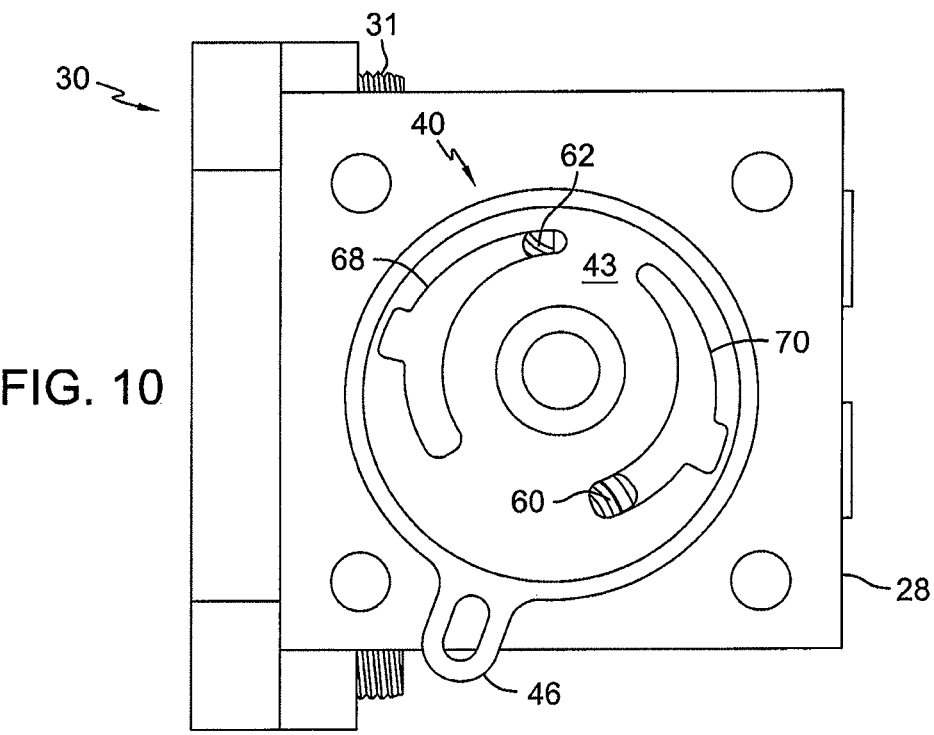
FIG. 10 is a top plan view similar to FIG. 6, showing the gerotor cup rotated in a second direction.

Cup 40 is movable between a variety of positions, several of which are depicted in the figures, and movement of cup 40 affects the flow of hydraulic fluid from pump assembly 26, thereby acting like a proportional valve. The location of cup 40 as shown in FIGS. 4 and 5 correspond to a neutral position of pump assembly 26, as will be described below. FIGS. 8 and 9 depict cup 40 moved in a first direction, while FIG. 10 shows cup 40 moved in a second direction, opposite to the first direction. As will be understood, one of these directions will correspond to a "forward" direction of drive system 20 while the other will correspond to a "reverse" direction, and drive system 20 is infinitely variable between its full forward and full reverse positions based on the position of cup 40 as it is moved through its full range of motion.

It will be understood that the required range of motion of cup 40 in this design can be quite small, depending on the arc length subtended by passages 54 and 56. In the present embodiment, passages 54 and 56 subtend approximately 18 degrees, so cup 40 is movable to approximately 20 degrees to completely block passages 54 and 56. As will be seen, the size of passages 54 and 56 needs to be adequate to accommodate the full fluid flow of pump assembly 26, so a smaller displacement pump may result in a smaller arc length for passages 54 and 56. Conversely, a larger displacement pump or other need for larger passages 54 and 56 may require a longer arc length for passages 54 and 56, and thus cup 40 may require more rotation to block passages 54 and 56. The maximum angle of rotation of cup 40 may also affect the arc length of kidney port 61 and kidney port 63, requiring these kidney ports to be longer or shorter in arc length to assure the full displacement of pump assembly 26 is available to first system passage 60 and second system passage 62.

Figure 6:
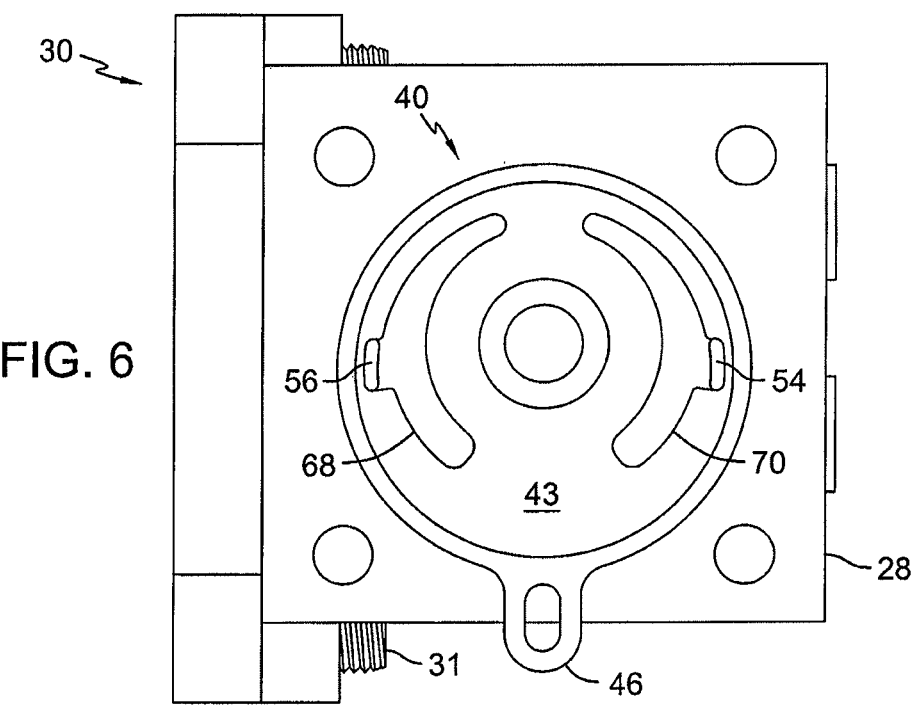
FIG. 6 is a top plan view similar to FIG. 5, with the inner and outer gerotor elements of the drive system removed.
Figure 11:
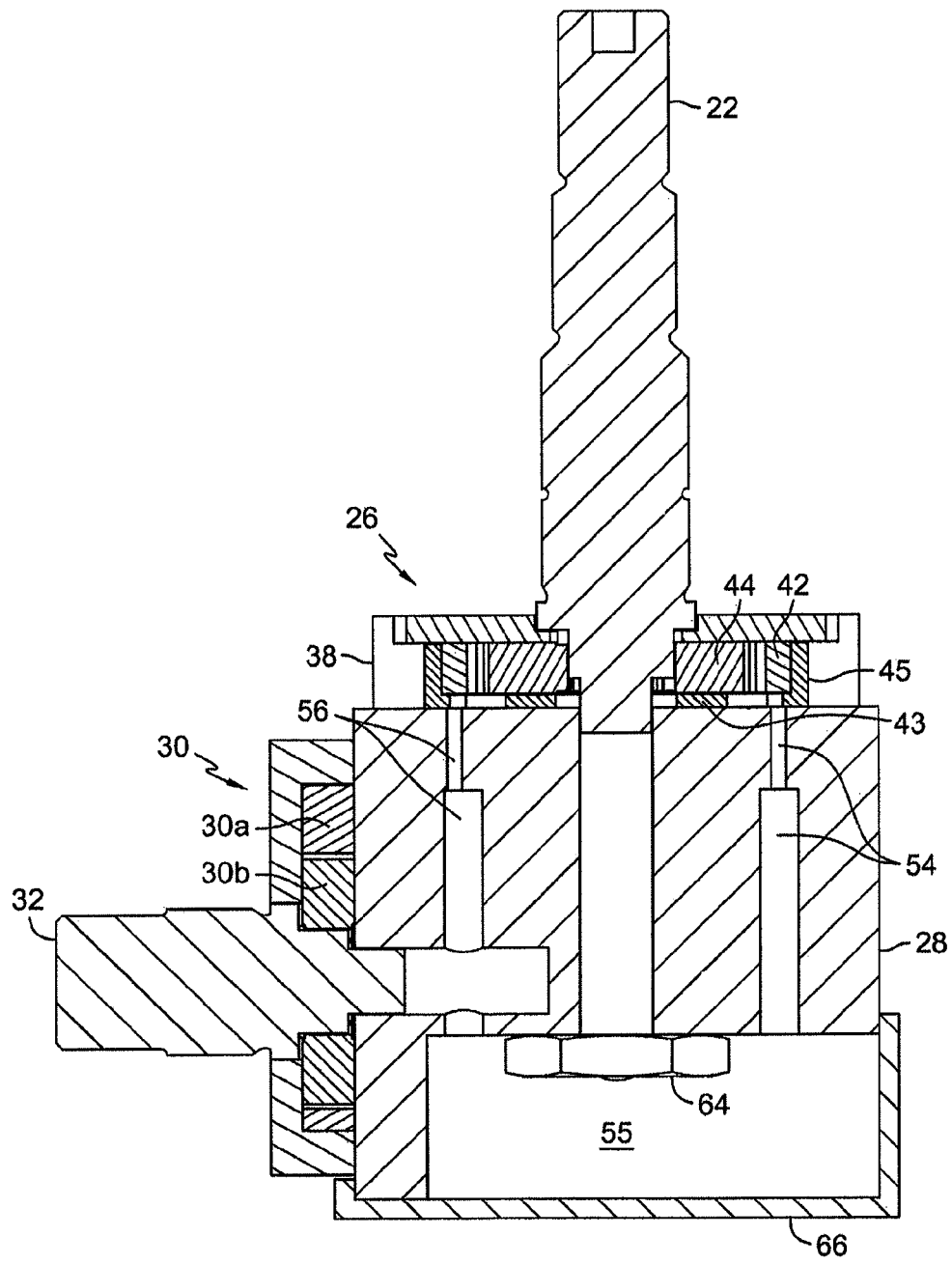
FIG. 11 is a sectional view of the drive system along the lines 11-11 in FIG. 4.

If cup 40 is positioned as shown in FIGS. 4 and 5, pump assembly 26 will be in a neutral position. However, outer gerotor element 42 and inner gerotor element 44 will continue to displace hydraulic fluid, so an alternate path for the displaced hydraulic fluid must be provided in order to prevent the displaced hydraulic fluid from causing motor assembly 30 to rotate. This alternative path, which may be referred to as a second porting system, comprises passages 54 and 56 formed in hydraulic mounting member 28, both of which are connected to an external surface of hydraulic mounting member 28. In the embodiment shown, these passages terminate in a filter sump 55, which may optionally be formed by use of filter 66 and main sump 58. When cup 40 is in this "neutral" position, hydraulic fluid pumped from pump assembly 26 will flow through opening 68 formed in cup 40 into passage 56 and then into filter sump 55 as shown in FIGS. 6, 11 and 15. Pump assembly 26 will simultaneously pull hydraulic fluid from filter sump 55 through passage 54 and then through opening 70 formed in cup 40. Thus, when pump assembly 26 is in neutral, hydraulic fluid will be circulated by pump assembly 26 from and to filter sump 55, and no fluid will flow to motor assembly 30.

As cup 40 is rotated from the neutral position, alternative flow passages 54 and 56 are slowly closed, while first system passage 60 and second system passage 62 are slowly opened. If inner gerotor 44 is rotated clockwise when viewed as shown in FIG. 5 and if cup 40 is rotated counterclockwise, as shown in FIG. 8, then pump assembly 26 will supply pressurized fluid through first system passage 60 and passage 56 while pulling fluid from second system passage 62 and passage 54. The amount of fluid going into passage 56 will decrease as cup 40 is rotated counterclockwise until cup 40 reaches the fully rotated position, as shown in FIG. 9. Thus, cup 40 and its interaction with the various porting elements formed in hydraulic mounting member 28 forms a proportional valve. Because cup 40 interfaces with hydraulic mounting member 28 along a plane, the amount of fluid pumped into passage 56 and the amount of fluid pulled from passage 54 will be negligible when cup 40 is in the position shown in FIG. 9. Also, the flow of fluid into first system passage 60 and the fluid pulled from second system passage 62 will be the maximum possible.

Moving cup 40 clockwise will cause similar conditions to occur in passage 54, passage 56, first system passage 60 and second system passage 62, only the passages previously pressurized will become suction passages and the passages previously under suction will become pressurized passages. Thus, when cup 40 is in the position shown in FIG. 10, fluid flow from gerotor assembly 26 will be into second system passage 62 and fluid will be pulled into gerotor assembly 26 from first system passage 60.

Figure 12:
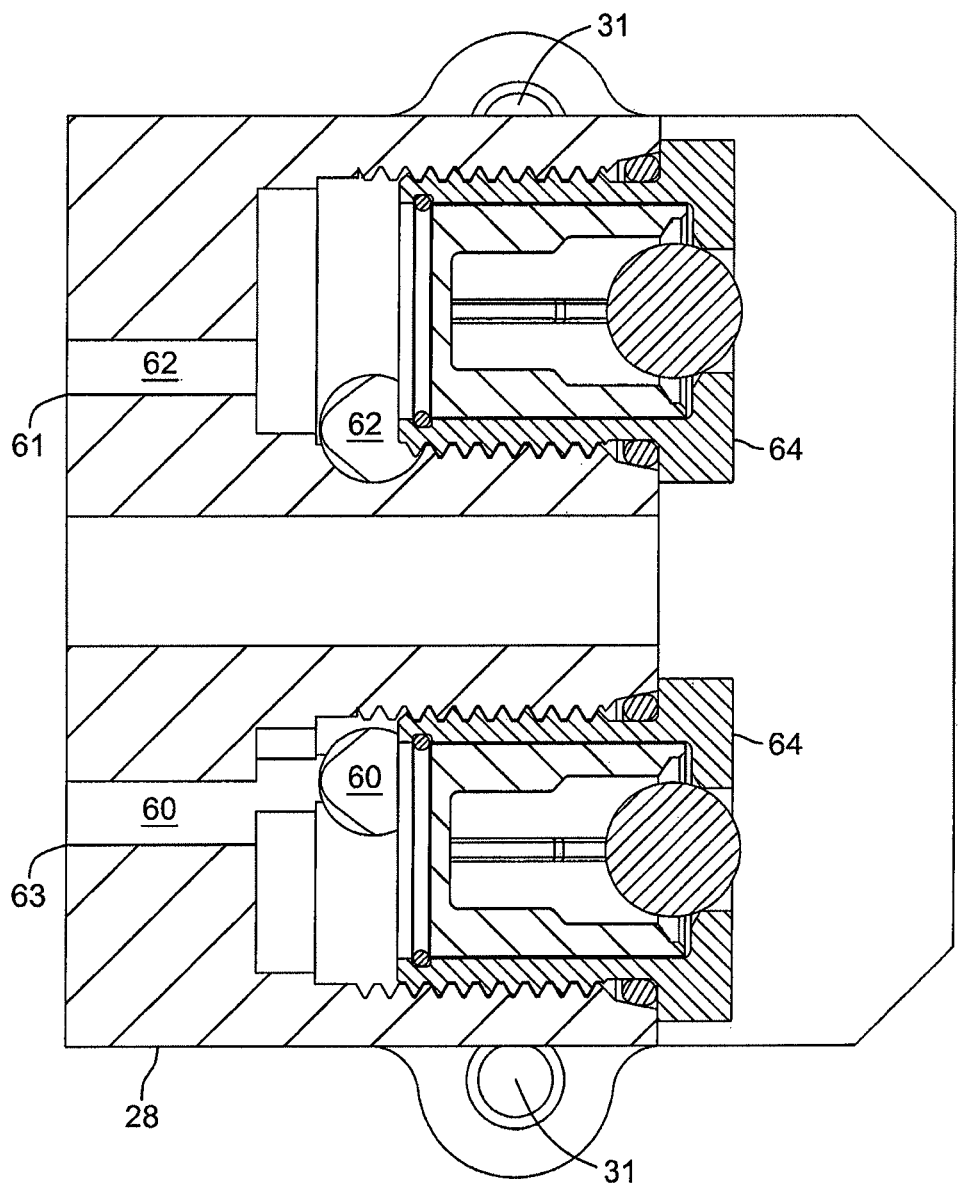
FIG. 12 is a sectional view of the hydraulic mounting member of the drive system along lines 12-12 in FIG. 7.

Leakage may occur from various places in this system. As shown, e.g., in FIGS. 12 and 15, first and second check valves 64 may be provided to replace leaked fluid in the system. Check valves 64 may permit fluid to enter either first system passage 60 or second system passage 62 from filter sump 55 when either first system passage 60 or second system passage 62 attains vacuum pressure, meaning a pressure below atmospheric pressure.

Other elements are adaptable to this configuration. Various valves may be adapted to interface with this invention, such as one of the valves shown in U.S. Pat. No. 4,674,287 or a combination valve similar to that shown in commonly owned U.S. Pat. Nos. 5,546,752, 6,691,512, or 7,028,708. The teachings of these patents are incorporated herein by reference.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

I claim:

1. A drive system, comprising:
   an input shaft driven by a prime mover and extending into a housing, the input shaft having a first axis of rotation;
   a hydraulic mounting member disposed in the housing and having a first surface and hydraulic porting connected to the first surface and to a sump;
   a hydraulic pump assembly disposed on the first surface and comprising a gerotor pump rotatably positioned on a gerotor support member, the gerotor support member having a plurality of openings formed therein and wherein the gerotor support member is movable between a plurality of positions with respect to the hydraulic mounting member;
   a hydraulic motor assembly disposed in the housing and driven by the gerotor pump; and
   an axle driven by the hydraulic motor assembly and extending out of the housing.

2. The drive system of claim 1, wherein the hydraulic porting comprises a first pair of hydraulic passages extending from the first surface of the hydraulic mounting member, and a second pair of hydraulic passages extending from the first surface to the sump; and wherein the plurality of positions comprises at least one first position where the gerotor support member permits fluid communication between the gerotor pump and the first pair of hydraulic passages through at least one of the plurality of openings, and at least one second position where the gerotor support member permits fluid communication between the gerotor pump and the sump through at least one of the plurality of openings and the second pair of hydraulic passages.

3. The drive system of claim 2, wherein the sump is disposed in the housing and comprises a main sump and a filter sump connected to the main sump.

4. The drive system of claim 3, wherein the filter sump is formed by a filter member connected to a bottom surface of the hydraulic mounting member, opposite to the first surface.

5. The drive system of claim 2, wherein the gerotor support member comprises a cup having a generally flat surface on which the gerotor pump is disposed and a side surface forming a cylinder, and further comprising a cover that cooperates with the cup to enclose the gerotor pump, wherein the cover is secured to the hydraulic mounting member and the cup is retained between the cover and the hydraulic mounting member.

6. The drive system of claim 1, wherein the hydraulic motor assembly is engaged to and drives a motor shaft that has a second axis of rotation that is perpendicular to the first axis of rotation.

7. The drive system of claim 6, wherein the hydraulic motor assembly is disposed on a second surface formed on the hydraulic mounting member generally perpendicular to the first surface, and the axle has a third axis of rotation that is parallel to the second axis of rotation.

8. The drive system of claim 6, wherein the sump is disposed in the housing and comprises a main sump and a filter sump connected to the main sump, wherein the filter sump is formed by a filter member connected to a bottom surface of the hydraulic mounting member, opposite to the first surface.

9. The drive system of claim 8, wherein the hydraulic porting further comprises a first pair of hydraulic passages extending from the first surface of the hydraulic mounting member, and a second pair of hydraulic passages, the drive system further comprising a first check valve connecting one of the second pair of hydraulic passages with the filter sump and a second check valve connecting the other of the second pair of hydraulic passages with the filter sump.

10. A drive system, comprising:
    an input shaft driven by a prime mover and extending into a housing, the input shaft having a first axis of rotation;
    a hydraulic pump assembly disposed in the housing and hydraulically connected to a first pair of hydraulic passages and a second pair of hydraulic passages;
    a sump hydraulically connected to the second pair of hydraulic passages; and
    a proportional valve located between the hydraulic pump assembly and the first and second pairs of hydraulic passages; and
    a hydraulic motor assembly driven by the hydraulic pump assembly.

11. The drive system of claim 10, further comprising an axle driven by the hydraulic motor assembly and extending out of the housing, wherein the hydraulic motor assembly is engaged to and drives a motor shaft that has a second axis of rotation that is perpendicular to the first axis of rotation and the axle has a third axis of rotation that is parallel to the second axis of rotation.

12. The drive system of claim 11, further comprising a hydraulic mounting member disposed in the housing, wherein the hydraulic pump assembly and the proportional valve are disposed on a first surface formed on the hydraulic mounting member, and the hydraulic motor assembly is disposed on a second surface formed on the hydraulic mounting member, and the first surface is generally perpendicular to the second surface, and the first pair of hydraulic passages and the second pair of hydraulic passages are formed in the hydraulic mounting member and connected to the first surface.

13. The drive system of claim 12, wherein the sump comprises a main sump and a filter sump connected to the main sump through a filter, wherein the filter sump is formed by a filter member connected to a third surface of the hydraulic mounting member, opposite to the first surface.

14. The drive system of claim 13, further comprising a first check valve to connect one of the second pair of hydraulic passages to the filter sump and a second check valve to connect the other of the second pair of hydraulic passages to the filter sump.

15. The drive system of claim 11, wherein the hydraulic pump assembly comprises a gerotor and the proportional valve comprises a movable portion on which the gerotor rotates and a plurality of openings formed in the movable portion to interface with at least two of the passages in the first and second pairs of hydraulic passages.

16. A drive system comprising:
an input shaft driven by a prime mover and extending into a housing, the input shaft having a first axis of rotation;
a hydraulic pump assembly disposed in the housing on a first surface and driven by the input shaft, the hydraulic pump assembly comprising a pump body and a support member disposed between the first surface and the pump body, the support member comprising a pump surface and a plurality of openings formed in and extending through the pump surface to permit fluid communication between the support member and the first surface;
a first porting system in fluid communication with the first surface and with the pump body through the support member; and
a sump hydraulically connected to the first surface by a second porting system;
wherein the support member is movable between a plurality of positions, the plurality of positions including at least one first position where the support member permits fluid communication between the hydraulic pump assembly and the first porting system and at least one second position where the support member permits fluid communication between the hydraulic pump assembly and the sump through the second porting system; and
a motor assembly driven by the hydraulic pump assembly, the motor assembly engaged to and driving an axle that extends out of the housing, wherein the axle has a second axis of rotation.

17. The drive system of claim 16, further comprising a hydraulic mounting member, where the first surface is formed thereon, and the first and second porting systems are integrally formed therein, and the pump body comprises a gerotor and the support member comprises a cup and a cover secured to the cup to encapsulate the gerotor.

18. The drive system of claim 17, wherein the sump comprises a main sump and a filter sump connected to the main sump through a filter member, and the filter sump is formed by the filter member connected to a bottom surface of the hydraulic mounting member, opposite to the first surface.

19. The drive system of claim 18, wherein the motor assembly is engaged to and drives a motor shaft, and the motor assembly is a gerotor motor disposed on a second surface formed on the hydraulic mounting member generally perpendicular to the first surface, and the second axis of rotation is perpendicular to the first axis of rotation.

20. The drive system of claim 19, wherein the first porting system comprises a first pair of hydraulic passages extending from the first surface of the hydraulic mounting member, and the second porting system comprises a second pair of hydraulic passages extending from the first surface to the sump; and wherein in the at least one first position the support member permits fluid communication between the pump body and the first pair of hydraulic passages through at least one of the plurality of openings, and in the at least one second position the support member permits fluid communication between the pump body and the sump through at least one of the plurality of openings and the second pair of hydraulic passages.

\* \* \* \* \*